Oct. 12, 1948.   B. H. FOSTER   2,450,948
METHOD OF MAKING ELASTIC FABRICS
Filed Sept. 26, 1947
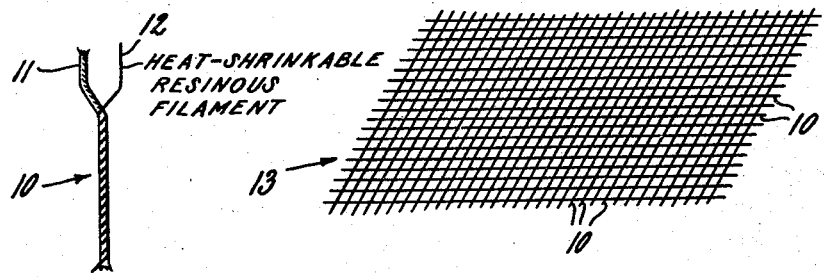
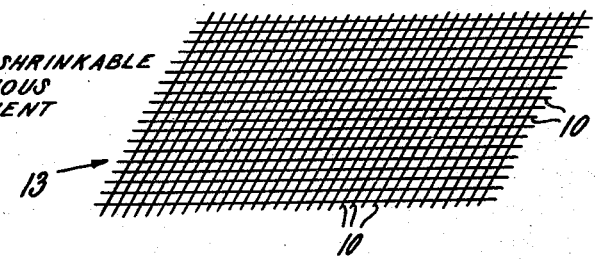
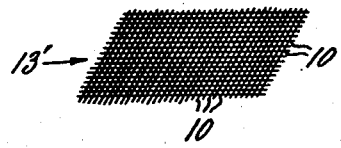
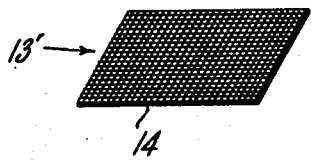
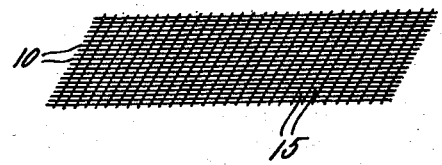
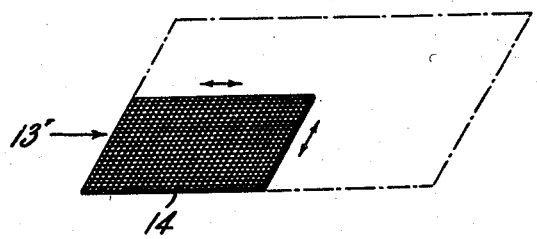
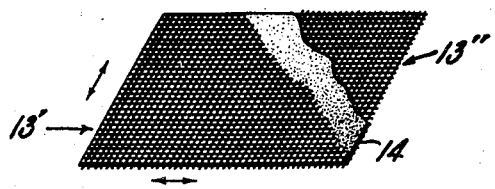
INVENTOR.
BOUTWELL H. FOSTER
BY Charles C. Willson
ATTORNEY Patented Oct. 12, 1948

2,450,948

UNITED STATES PATENT OFFICE 2,450,948

METHOD OF MAKING ELASTIC FABRICS

Boutwell H. Foster, Maplewood, N. J., assignor to United States Rubber Company, New York, N. Y., a corporation of New Jersey Application September 26, 1947, Serial No. 776,383

7 Claims. (Cl. 28—73)

This invention relates to a novel method of making elastic fabrics, and more particularly to a novel method of making a rubber backed elastic fabric.

It has been proposed heretofore to stretch a knitted fabric in one direction to thereby contract such fabric in a direction at right angles thereto, and then apply a layer of rubber to the condensed fabric so that the fabric and rubber sheet may stretch together from the condensed condition. Also, other expedients have been used to mechanically condense a fabric so that a layer of rubber may be bonded thereto while the fabric is condensed, to thereby form a plied construction in which the fabric and rubber will stretch together. It, however, has been found difficult in practice to condense the fabric to a substantial degree and maintain it condensed while a sheet of rubber is being bonded thereto or vulcanized thereto to produce a stretchable fabric having good elasticity.

The present invention contemplates a novel method whereby a loosely constructed fabric which is to be provided with a rubber or rubber-like backing may be easily condensed either in one or both directions so that either dimension is reduced by as much as sixty percent. or more, and retained in this condensed condition until the desired layer of rubber or rubber-like material is firmly bonded thereto, whereupon the means employed to contract the fabric may be easily disposed of so that the fabric and rubber sheet are capable of being stretched together.

The method of the present invention may be described as employing the following steps:

1. Forming a highly shrinkable composite yarn by twisting together a non-thermoplastic or ordinary yarn and a relatively much smaller, heat-shrinkable, continuous resinous filament;
2. Forming an open or loosely constructed fabric in part or entirely of such shrinkable composite yarn;
3. Heating the fabric sufficiently at a temperature to contract the shrinkable yarn and thereby contract the fabric;
4. Applying a stretchable rubber-like coating to this contracted fabric in bonded relation thereto; and
5. Treating this coated contracted fabric to destroy the resinous filament so that the coated fabric is capable of being readily stretched to an extent fixed by the ordinary yarns remaining in the fabric.

The present method may be employed for the production of elastic rubber-like sheet material backed by woven, knitted, braided or other types of fabrics, the composite material having any desired range of extensibility up to three hundred percent. or more either longitudinally or transversely or both longitudinally and transversely as desired.

The various features of the present invention will be further understood from the following description when read in connection with the accompanying drawing, wherein:

Fig. 1 is a side view of a short length of ordinary textile yarn having associated therewith a much smaller heat-shrinkable resinous filament;

Fig. 2 is a plan view of a loosely woven fabric formed of the shrinkable composite yarn of Fig. 1;

Fig. 3 is a plan view of the fabric of Fig. 2 after the latter has been condensed by a heat treatment;

Fig. 4 shows the condensed fabric of Fig. 3 as having a sheet or layer of rubber bonded to its lower face;

Fig. 5 is a similar view showing the construction of Fig. 4 after the latter has been treated to destroy the resinous filament so that the fabric is freely stretchable in both directions as indicated by the arrows;

Fig. 6 is a plan view, partly broken away, of a modified construction having the general construction of Fig. 5 except that a sheet of rubber is bonded between two layers of condensed fabric to form a sandwich; and Fig. 7 is a further modification showing a woven fabric having its warp formed of heat-shrinkable yarns and its weft formed of ordinary yarns.

The shrinkable composite yarn designated by 10 in Fig. 1 and in the other views may be produced by associating, as by twisting, any desired ordinary yarn 11, formed of cotton, rayon, wool or other non-thermoplastic fibers or filaments and being either a single or a plied yarn, with a much smaller strand comprising a heat-shrinkable resinous filament 12. The properties of this filament are important and should be such that upon application of heat, at a temperature and time that will not result in injury to the ordinary yarn 11, it will shrink to a pronounced degree and thereby contract the yarn 11. In making up the heat-shrinkable yarn 10 satisfactory results are secured by uniting the yarn 11 and filament 12 with various degrees of twist, from a nominal twist of two or three turns per inch, to as high as 18 turns per inch, and when the filament 12 is thermally shrunken it will contract the yarn 10 longitudinally and cause it to swell laterally. The lower the ply twist in the composite yarn, the greater is the degree of contraction when the fabric is heated subsequently.

The heat-shrinkable resinous filament 12 should be an oriented synthetic filament which will contract greatly, say by 50% to 80%, upon the application of heat at a temperature well before its softening or flow temperature and which will melt or flow and disappear as a filament when heated to a somewhat higher temperature but below a temperature that will injure the associated yarn 11. The important contractile property of the thermoplastic filament depends upon what is known as "elastic memory," that is, the property of many high molecular weight polymers of returning, when heated, to a shorter length from which it has been drawn out at some previous stage in its manufacture. Examples of such commercial filaments that may be used are:

An oriented copolymer of vinyl chloride (88 to 90%) with vinyl acetate (10 to 12%);

An oriented polymerized ethylene (polyethylene);

An oriented copolymer of vinylidene chloride with a small proportion (about 4 to 10 generally about 5%) of vinyl chloride;

An oriented polyester of terephthalic acid with ethylene glycol.

The temperature range over which the greater part of the shrinkage take place varies with the particular variety of thermoplastic yarn employed, and is a well-known characteristic of each type of yarn. As the upper end of the shrinkage temperature range is approached the amount of further shrinkage taking place decreases and finally becomes practically nil. For example, in the case of vinyl chloride/vinyl acetate copolymer filaments the greater part of the shrinkage takes place in the range from 160° F. to 175° F., and as the temperature rises above 175° F. the further shrinkage becomes less and less and virtually no further change in length occurs above 210° F. The length of time required to effect the full shrinkage becomes shorter, the higher is the temperature to which the material is subjected; for example, after three minutes in air at 190° F. there is very little further change in length, or after one minute at 210° F., in the case of the vinyl copolymer. In water, the shrinkage is still more rapid, being virtually complete in ten seconds at 195° F. For other thermoplastic filaments the shrinkage temperatures may be higher or lower. It will be realized that the above temperatures and times are given merely as illustrations of known properties of known filaments and are not to be regarded as limiting the present invention.

The yarn 10 can be knitted, woven or otherwise manipulated to produce a loose or openly constructed fabric, and the degree of openness selected will depend largely upon the amount by which the fabric is to be contracted. The desired open fabric may be made entirely of this heat-shrinkable yarn 10, or the yarns 10 may have ordinary yarns interwoven or otherwise associated therewith in various well known manners, such for example as have been employed heretofore in weaving or otherwise constructing fabrics of different yarns such as cotton yarns and rayon yarns used in various arrangements.

Fig. 2 of the drawing shows a loosely woven or openly constructed fabric formed entirely of the shrinkable yarns 10 in both the warp and weft. This fabric while in the open or fully extended condition shown in Fig. 2 is designated in its entirety by the numeral 13. In order to shrink this fabric 13 both longitudinally and transversely, it is merely necessary to apply heat to the fabric of Fig. 2 to cause the filament 12 to shrink. This will cause the yarns 10 in both the warp and weft to contract and form the much smaller and more compact fabric indicated by 13' in Fig. 3 of the drawing.

While the fabric is held contracted by the thermo-shrunken filaments as shown in Fig. 3, it is provided with a layer or sheet of rubber 14 bonded thereto as shown in Fig. 4. This layer 14 may be formed of either natural or synthetic rubber or rubber-like material and may be applied to fabric 13' as a plastic film, which is to be later vulcanized, if so desired; it may be applied as a vulcanized sheet in which case the sheet should be bonded to the fabric 13' with a suitable adhesive, such as rubber cement; or it may be applied by the spraying or the spreading of a liquid dispersion of the rubber or rubber-like material by well-known techniques.

After the rubber layer 14 has been applied to or bonded to the fabric 13' to form the construction of Fig. 4, the rubber backed fabric thus produced should be heated to a higher degree than was the fabric 13 of Fig. 2, since it is now desirable to destroy the shrunken filaments 12 so that they will no longer hold the fabric 13' in a condensed condition, as the rubber sheet 14 will now serve to hold this fabric yieldingly in its contracted or condensed condition. In place of heat, solvents or mechanical means may be used for destroying the thermoplastic filament. After the filaments 12 have been destroyed and the rubber sheet 14 has been vulcanized the composite sheet 14 is capable of being stretched to a pronounced degree both longitudinally and transversely as indicated by the arrows in Fig. 5, so that this fabric when fully extended in both directions will reach the dot and dash line position of Fig. 5, the ordinary textile yarns which remain in the material acting as stop yarns to limit the stretching of the rubber.

The heating of the open fabric 13 of Fig. 2 to produce the condensed and more compact fabric 13' of Fig. 3 may be carried out by placing the fabric in hot water or steam or by passing it about or between heated rolls while it is permitted to contract freely. After the rubber sheet 14 has been applied to the fabric 13' the second heat treatment employed to destroy the filaments 12 so that the fabric will be free to stretch is preferably applied by confining the fabric between the heated upper and lower platens of a press, so as to exert a bonding pressure on the fabric and rubber sheet at this time.

The modified construction shown in Fig. 6 comprises an upper layer of condensed fabric 13' and a lower layer 13" of a similar condensed fabric. Between these two sheets of fabric is interposed a rubber sheet 14 which is firmly bonded to the fabrics 13' and 13" to thereby provide a two-way stretch fabric in which the rubber sheet 14 is sandwiched between the two stretchable fabric sheets.

The modified construction shown in Fig. 7 is of the type that may be employed to form a one-way stretch elastic fabric, in that this fabric is intended to contract longitudinally but not transversely. This fabric of Fig. 7 is therefore shown as having the shrinkable yarns 10 extending longitudinally or in the direction in which the fabric is to be made stretchable, and has ordinary yarns 15 extending at right angles thereto. It will be noted that the yarns 15 are spaced a substantial distance apart as they will be moved towards each other when the yarns 10 are thermally shrunk to condense this fabric. The yarns 10 will not be moved toward each other when the fabric shrinks, they are therefore placed close to each other in the fabric of Fig. 7. After the fabric of Fig. 7 has been heat treated to shrink the same, a layer or sheet of rubber should be firmly bonded thereto as above described, and then this fabric should be further heat treated to destroy the resinous filaments of the yarns 10 so that this fabric may stretch in one direction with the rubber sheet bonded thereto. In place of the second heat treatment, a solvent for the thermoplastic material may be used to destroy the filaments; or the fine, light filaments may be broken up by tension applied locally and progressively along the coated fabric.

After the rubber is applied to the fabric in the desired thickness, it is cured at the appropriate temperature and pressure, preferably in a hydraulic press that will hold the rubber firmly against the fabric during the cure. This will result in a very firm bond between the vulcanized rubber sheet thus formed and the fabric. The elastic fabric formed in this manner will be non-porous as air will not penetrate through the rubber sheet.

Should it be desired to employ the method of the present invention to produce an elastic fabric that is porous this can be accomplished by preforming the vulcanized sheet 14 and punching or otherwise producing small holes in this sheet at desired intervals so that air may pass through these apertures. This perforated rubber sheet may then be bonded firmly to the fabric 13' by a rubber cement, and if desired air under pressure may be forced through the apertures in this rubber sheet before the bonding cement completely sets to thereby prevent the cement from closing these ventilating apertures.

In order to further illustrate the present invention when embodied in an elastic fabric having the general construction shown in Fig. 5 of the drawing, the following examples are given.

present method provides a simple and practical method of providing a rubber backed elastic fabric having a long stretch or any desired range of stretch. Elastic fabric produced in accordance with the present method may be used for elastic webbing, bathing suits, elastic garments of the corset type, mattress covers, upholstery, slip covers and for other purposes.

Having thus described my invention, what I claim and desire to protect by Letters Patent is:

1. The method of making an elastic fabric, which includes the steps of forming a shrinkable yarn by twisting together a non-thermoplastic yarn and a heat-shrinkable resinous filament, forming a loosely constructed fabric embodying this shrinkable yarn, heating the fabric sufficiently to contract the shrinkable yarn in situ and thereby contract the fabric, bonding a sheet of rubber to a face of the contracted fabric, and heating the fabric to destroy said filaments so that the contracted fabric and rubber sheet can be stretched together.

2. The method of making an elastic fabric, which includes the steps of forming a shrinkable yarn by uniting a textile yarn and a heat-shrinkable resinous filament, forming a loosely constructed fabric embodying this shrinkable yarn throughout the fabric, heating the fabric sufficiently to contract the shrinkable yarn and thereby contract the fabric, bonding a sheet of rubber to a face of the contracted fabric, and heating the fabric sufficiently to destroy said filaments so that the contracted fabric and rubber sheet can be stretched together.

3. The method of making an elastic fabric, which includes the steps of forming a shrinkable yarn by uniting a textile yarn and a heat-shrinkable resinous filament, embodying this shinkable yarn in a woven fabric, heating the fabric sufficiently to contract the shrinkable yarn and thereby contract the fabric, bonding a sheet of rubber to a face of the contracted fabric, and heating the fabric sufficiently to destroy said filaments and allow the fabric to be stretched.

4. The method of making an elastic fabric capable of stretching over fifty percent, which in-

| | | Example 1 | | | Example 2 | | |
|---|---|---|---|---|---|---|---|
| | | Before Condensing | After Condensing | Rubber Coated | Before Condensing | After Condensing | Rubber Coated |
| 1 | Warps per inch | 9.5 | 22 | 22 | 32 | 49 | 54 |
| 2 | Wefts per inch | 11.5 | 25 | 22 | 29 | 52 | 50 |
| 3 | Wt. (ozs./sq. yd.) | 2.6 | 11.5 | 21.4 | 4.3 | 10.7 | 23.2 |
| 4 | Construction W. & F. Yarns | 2 ends of 14/1 Cotton Plied with 1 end of 80 den. Vinyon. | | | 1 end of 12/1 Cotton Plied with 1 end of 80 den. Vinyon. | | |
| 5 | Twist/inch of Plied Yarn | 12.4 | | | 6.3. | | |
| 6 | Per cent Cotton in fabric (before coating) | 90% | | | 84%. | | |
| 7 | Per cent Vinyon in fabric (before coating) | 10% | | | 16%. | | |
| 8 | Effective Stretch, Warp Direction | 80% | | | 65%. | | |
| 9 | Effective Stretch, Weft Direction | 100% | | | 90%. | | |

It will be noted from Example 1 of the table that the finished composite elastic fabric had an effective stretch in the warp direction of 80% and an effective stretch weftwise of 100%, which is a surprisingly high range of stretch for a two-way stretch fabric. When this fabric is fully stretched in both directions the area will be increased nearly 400% as will be seen by comparing the size of the fabric 13' in Fig. 5 of the drawing with the fully extended dot and dash line of this view.

It will be apparent from the foregoing that the cludes the steps of forming a shrinkable yarn by uniting a textile yarn and a heat-shrinkable resinous filament, forming a loosely constructed woven fabric embodying this shrinkable yarn, heating the fabric sufficiently to contract the shrinkable yarn and thereby contract the fabric, bonding a sheet of rubber to the contracted fabric, and heating the fabric sufficiently to destroy said filaments so that the contracted fabric and rubber sheet can be stretched together.

5. The method of making a two-way stretch elastic fabric, which includes the steps of forming a shrinkable yarn by twisting together a textile yarn and a heat-shrinkable resinous filament, forming a loosely woven fabric embodying this shrinkable yarn in both the warp and weft, heating the fabric sufficiently to contract the shrinkable fabric both longitudinally and transversely, bonding a sheet of rubber to the contracted fabric, and again heating the fabric to destroy said filaments and allow the fabric to be stretched with the rubber sheet.

6. The method of making an elastic fabric, which includes the steps of forming a shrinkable yarn by twisting together a textile yarn and a heat-shrinkable resinous filament, forming a loosely constructed fabric embodying this shrinkable yarn, heating the fabric sufficiently to contract the shrinkable yarn and thereby contract the fabric, bonding a sheet of rubber between two sheets of this contracted fabric, and heating this sandwich construction to destroy said filaments so that the fabric and rubber can stretch together.

7. The method of making an elastic fabric, which includes the steps of forming a shrinkable yarn by uniting a textile yarn and a heat-shrinkable resinous filament, embodying this shrinkable yarn in a fabric, heating the fabric sufficiently to contract the shrinkable yarn and thereby contract the fabric, bonding a sheet of rubber to a face of the contracted fabric, and then destroying said filaments to allow the fabric to be stretched.

BOUTWELL H. FOSTER.

No references cited.